United States Patent [19]
Oliver et al.

[11] Patent Number: 6,016,606
[45] Date of Patent: Jan. 25, 2000

[54] NAVIGATION DEVICE HAVING A VIEWER FOR SUPERIMPOSING BEARING, GPS POSITION AND INDEXED MAP INFORMATION

[75] Inventors: Michael F. Oliver, Halifax; Richard A. MacDonald, Bedford; David C. Hill, Oakville, all of Canada

[73] Assignee: Navitrak International Corporation, Oakville, Canada

[21] Appl. No.: 09/064,606

[22] Filed: Apr. 23, 1998

Related U.S. Application Data

[60] Provisional application No. 60/044,111, Apr. 25, 1997.

[51] Int. Cl.⁷ .................................................. G01C 21/00
[52] U.S. Cl. .......................... 33/1 SD; 33/1 CC; 353/11; 434/153
[58] Field of Search .................................. 33/1 SB, 1 SC, 33/1 SD, 1 CC, 351, 356; 40/362, 366, 367; 342/357; 345/4, 5, 6; 353/11, 12, 13, 14, 30, 39, 43; 359/798, 809, 810; 434/153; 701/213

[56] References Cited

U.S. PATENT DOCUMENTS

| | | | |
|---|---|---|---|
| 3,826,579 | 7/1974 | Schurgin | 353/12 |
| 3,865,477 | 2/1975 | Gast | 353/11 |
| 4,360,346 | 11/1982 | Ehsanipour | 434/153 |
| 4,836,785 | 6/1989 | Linder | 434/153 |
| 5,060,390 | 10/1991 | Hill | 33/1 SD |
| 5,339,528 | 8/1994 | Hill | 33/1 SD |
| 5,442,557 | 8/1995 | Kaneko | 701/213 |
| 5,458,492 | 10/1995 | Holguin | 434/153 |
| 5,461,792 | 10/1995 | Hill | 33/1 SD |
| 5,552,989 | 9/1996 | Bertrand | 364/443 |
| 5,560,114 | 10/1996 | Lähteenmäki | 33/356 |
| 5,798,733 | 8/1998 | Ethridge | 342/357 |
| 5,819,199 | 10/1998 | Kawai et al. | 342/357 |
| 5,825,480 | 10/1998 | Udagawa | 356/138 |
| 5,857,066 | 1/1999 | Wyche et al. | 434/150 |
| 5,902,347 | 5/1999 | Backman et al. | 701/200 |

*Primary Examiner*—G. Bradley Bennett
*Attorney, Agent, or Firm*—Pennie & Edmonds LLP

[57] ABSTRACT

A hand-holdable viewer having a viewing end and a viewing axis, along the latter of which a transparent display is disposed. The viewer includes a Global Positioning System receiver (GPS) and a microprocessor connected to the GPS. The viewer is also provided with a slide holder for receiving a map slide having a map image and a EEPROM containing information about the geographical extent of the map image. When a map slide is inserted into the slide holder, it is aligned with the display, and so one is superimposed on the other, when viewed through the viewing end. The microprocessor reads the EEPROM and checks the GPS to determine whether the current position of the device is within the geographical extent of the map image. If this is so, the current position appears on the display. The EEPROM may also contain information about waypoints and routes which have previously been downloaded from a personal computer, or the like.

20 Claims, 3 Drawing Sheets

NAVIGATION DEVICE HAVING A VIEWER FOR SUPERIMPOSING BEARING, GPS POSITION AND INDEXED MAP INFORMATION

This Appln claims the Provisional Appln. No. 60/044,111 filed Apr. 25, 1997.

BACKGROUND OF THE INVENTION

The present invention relates generally to navigation aids. More particularly, it concerns a viewing device which allows one to superimpose a Global Positioning System (GPS) location onto a transparent map image.

The prior art teaches devices which use map transparencies mounted in a frame with a lens and a rotatable grid to facilitate map bearing. Such a device is shown, for example, in U.S. Pat. No. 3,094,781 to Vangor and U.S. Pat. Nos. 5,060,390 and 5,339,528 to Hill. However, these devices do not integrate the actual position of the viewer based on GPS data, with map information to help eliminate navigation error for amateur navigators.

SUMMARY OF THE INVENTION

The present invention is realized by a navigation device comprising a case having a first end for viewing and a viewing axis. The viewer includes a GPS sensor, a microprocessor which receives input from the GPS sensor, a transparent display mounted transverse to the viewing axis in the navigation device and driven by the microprocessor, and a battery powering the navigation device. A map slide comprising a transparent map of a predetermined geographical area is inserted into the case, parallel to the transparent electronic display. This allows one of the display and the map film to be superimposed on the other, when viewed from the viewing end of the case. The map slide is also provided with a map memory which stores information about the extent of the corresponding geographical area. When the map slide is inserted into the navigation device, the microprocessor reads the map memory and determines whether the current position of the viewer is within the extent of the map. If so, the microprocessor causes a cursor to be indicated at a corresponding position on the display so that a viewer can see the position of the cursor relative to the map.

Another feature of the present invention is a magnetic compass positioned at a second end of the case, the display and the map slide being positioned between the first and second ends. As the display and the map slide are transparent, one can see the compass needle from the viewing end. This allows a user to orient herself relative to magnetic north, when viewing the map.

Yet another feature of the present invention is that the map memory can also include information such as waypoints and routes to be displayed on the transparent display, and viewed at the same time as the map. The waypoints and routes can be written into the map memory by a personal computer, or the like. This can be done either at the time the extent of the map is written into the electronically, or subsequent thereto.

BRIEF DESCRIPTION OF THE DRAWINGS

These and other features, aspects, and advantages of the present invention can be seen in the drawings in which.

DESCRIPTION OF THE PREFERRED EMBODIMENT

The contents of U.S. Pat. Nos. 5,060,390 and 5,339,528 are incorporated by reference, to the extent necessary to understand the present invention.

Figure 1:
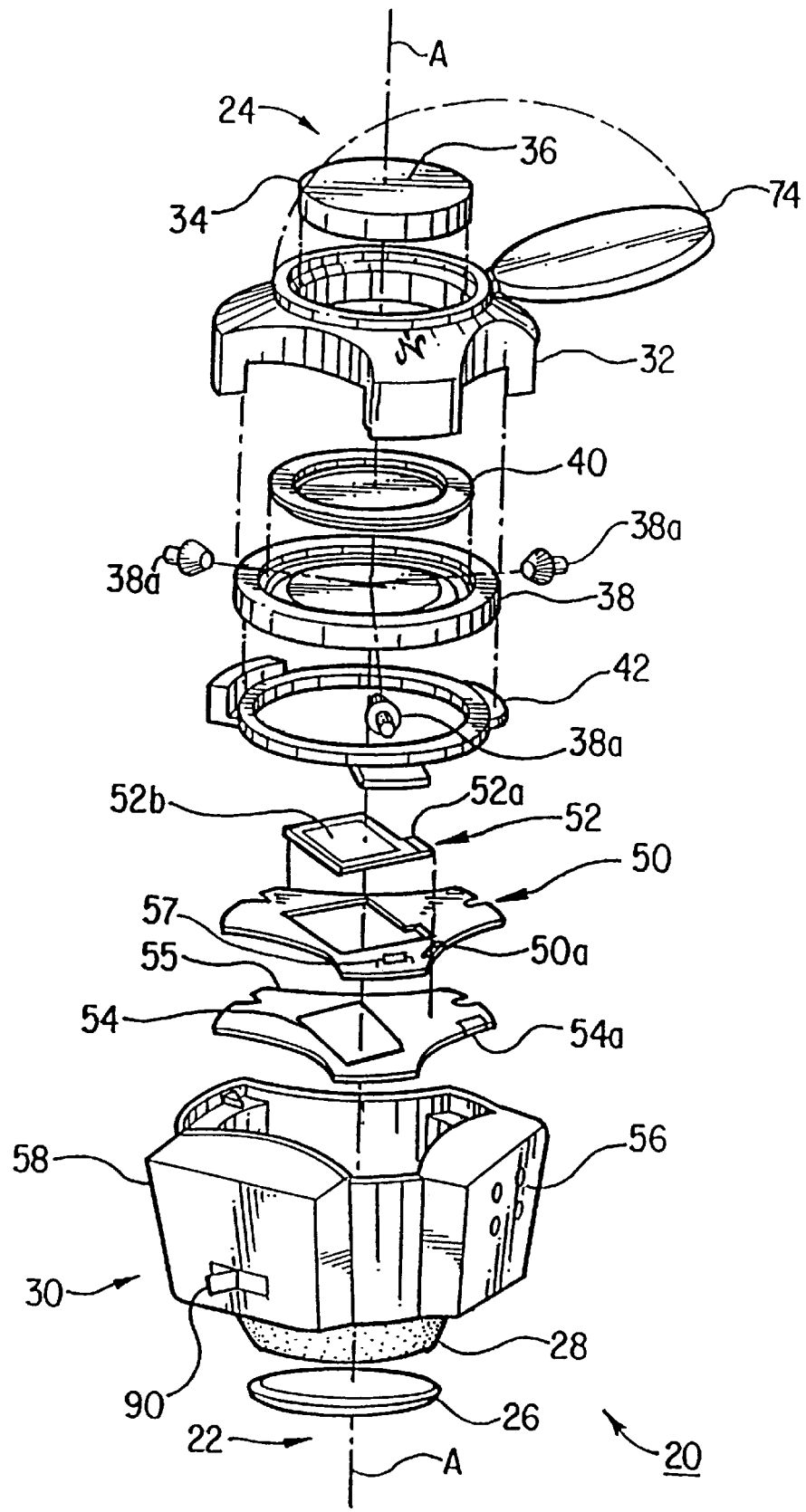
FIG. 1 shows an exploded view of a navigation device in accordance with the present invention.

FIG. 1 shows an exploded view of a navigation device 20 in accordance with the present invention. The navigation device 20 has a viewing axis A which extends from a first end 22 of the device to a second end 24 thereof. A lens 26 is positioned at the first end 22 of the device and connected thereto by a rubber eyepiece 28. Both the lens 26 and rubber eyepiece 28 are mounted in a lower casing 30 of the navigation device 20. When the device 20 is being used, a viewer looks through lens 26 down the viewing axis A.

Upper casing 32 is removably fastened to lower casing 30. Attached to the upper casing 32, at the second end 24 of the device 20 is a compass 34 having a compass needle 36 rotatably mounted on a pin. The compass 34 is provided with transparent upper and lower faces so as to permit light to pass therethrough. This allows one to view the compass 34 through the lens 26 when the device 20 is being used. A "North" marking or equivalent indicator is provided on the upper face of compass 34 so that it may be viewed when the navigation device 20 is inverted.

A grid wheel 38 and a direction wheel 40, both with transparent centers, are housed in the upper casing 32 below the compass 34. The wheels rotate in a controlled fashion using geared teeth and small gears 38a spaced in fixed positions between the wheels 38, 40 and around their circumference. The grid wheel 38 is inscribed with parallel grid lines and a first directional arrow aligned parallel to the grid lines. Meanwhile, the direction wheel 40 is inscribed with a second directional arrow. The first and second directional arrows align with each other when pointing at the "North" marking. The two wheels are arranged such that rotation of one wheel in a first direction causes counter-rotation of the second wheel in a second direction. The grid wheel 38 is retained by flange 42. Thus far, the description of a device in accordance with the present invention is similar to that in the aforementioned patents, which have been incorporated by reference.

The device of the present invention includes a slide holder 50 positioned substantially transverse to the viewing axis A and in the line of sight, at the upper end of the lower casing 30. Slide holder 50 is arranged to receive a map slide 52 which is inserted thereinto.

Figure 3:
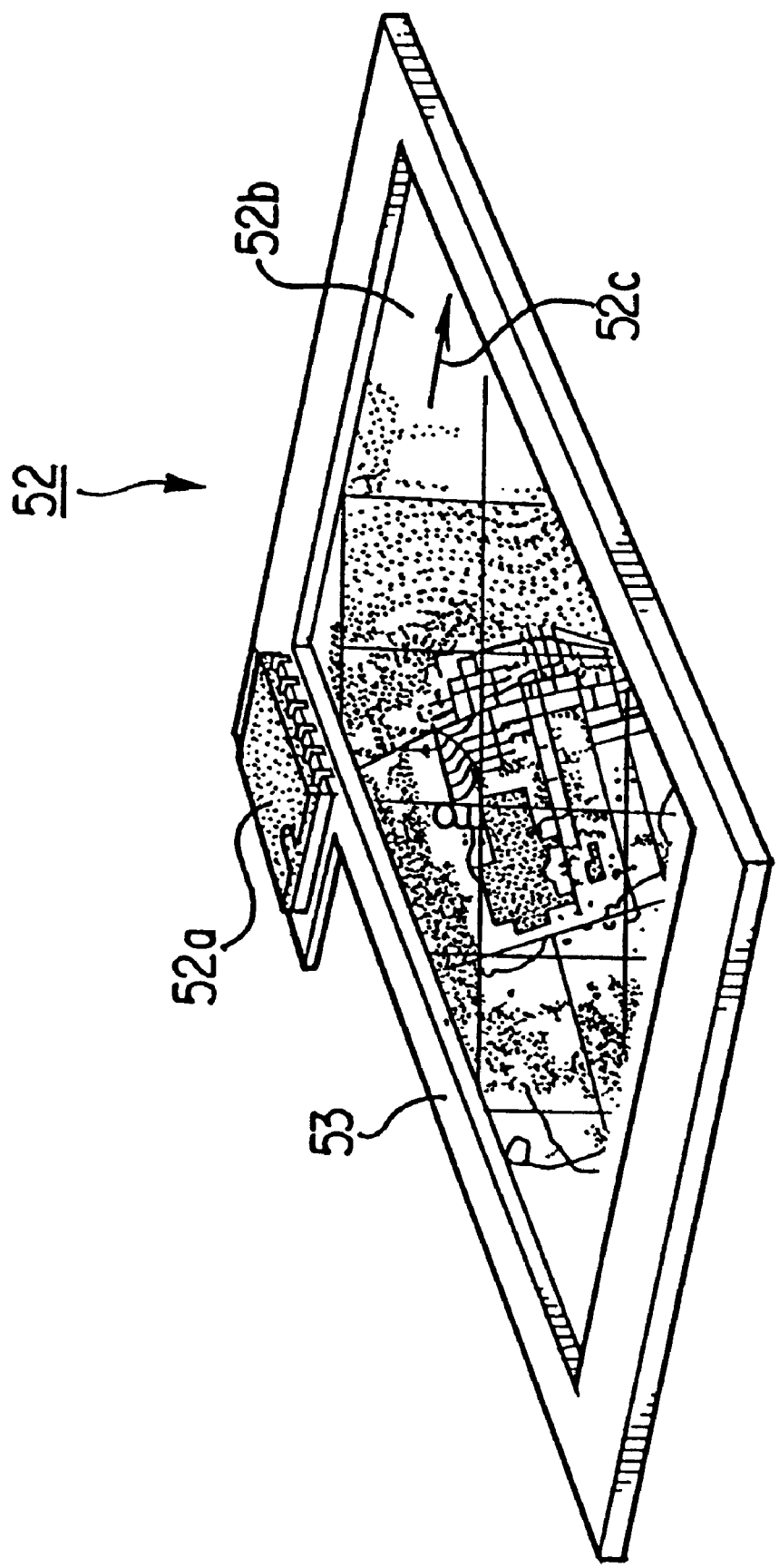
FIG. 3 shows a map slide in accordance with the present invention.

As shown in FIG. 3, the map slide 52 comprises a slide frame 53 provided with a map memory 52a and a transparent map image 52b. Slide holder 50 is equipped with an electrical connector 50a to interface the map memory 52a with other components of the device 20.

The map memory 52a is preferably implemented as an electronically erasable programmable read-only memory (EEPROM) 52a, although a simple PROM or EPROM may be used, if the user is not expected to erase and write to the map memory. The map memory 52a stores, among other things, information about the map, such as the geographical extent of the map contained on the map slide 52. The map memory 52a may also include user-specified data such as waypoints and routes on that map. The map memory 52a is electrically connected, via printed conductors, to the electrical connector 50a of the slide holder 50.

The transparent map image 52b is typically a color transparency or film which depicts a map of an area of a predetermined geographical extent. The transparent map image 52b can be derived from a raster scanned image created from either a photographic or digitized aerial image, or may even be vectorized image. In addition to the image, the transparent map image 52b may also show an arrow 52c or other symbol indicating true north. In general, there is no electrical connection between the map image 52b and the map memory 52a.

Positioned between the slide holder 50 and the lens 26, at a distance from the lens which approximates the lens' focal length, is a transparent electronic display 54 retained by a display holder 55. In the preferred embodiment, the display 54 is a field effect twisted nematic liquid crystal display (LCD), of the sort available from DCI, Inc. of Olathe, Kans., and having 200×200 pixels in an area of 2.0" square.

Attached to the lower casing 30 is a control unit 56 which directs the electronic operation of the navigation device. The control unit 56 is connected to the slide holder connector 50a of the slide holder 50 by a first ribbon cable, or equivalent (not shown). The control unit 56 is also connected to a display connector 54a of the display 54 by a second ribbon cable, or equivalent (also not shown).

Attached to lower casing 30 is a battery pack 58 which supplies power to the remainder of navigation device 20. In the preferred embodiment, battery pack 58 comprises four AA batteries.

Figure 2:
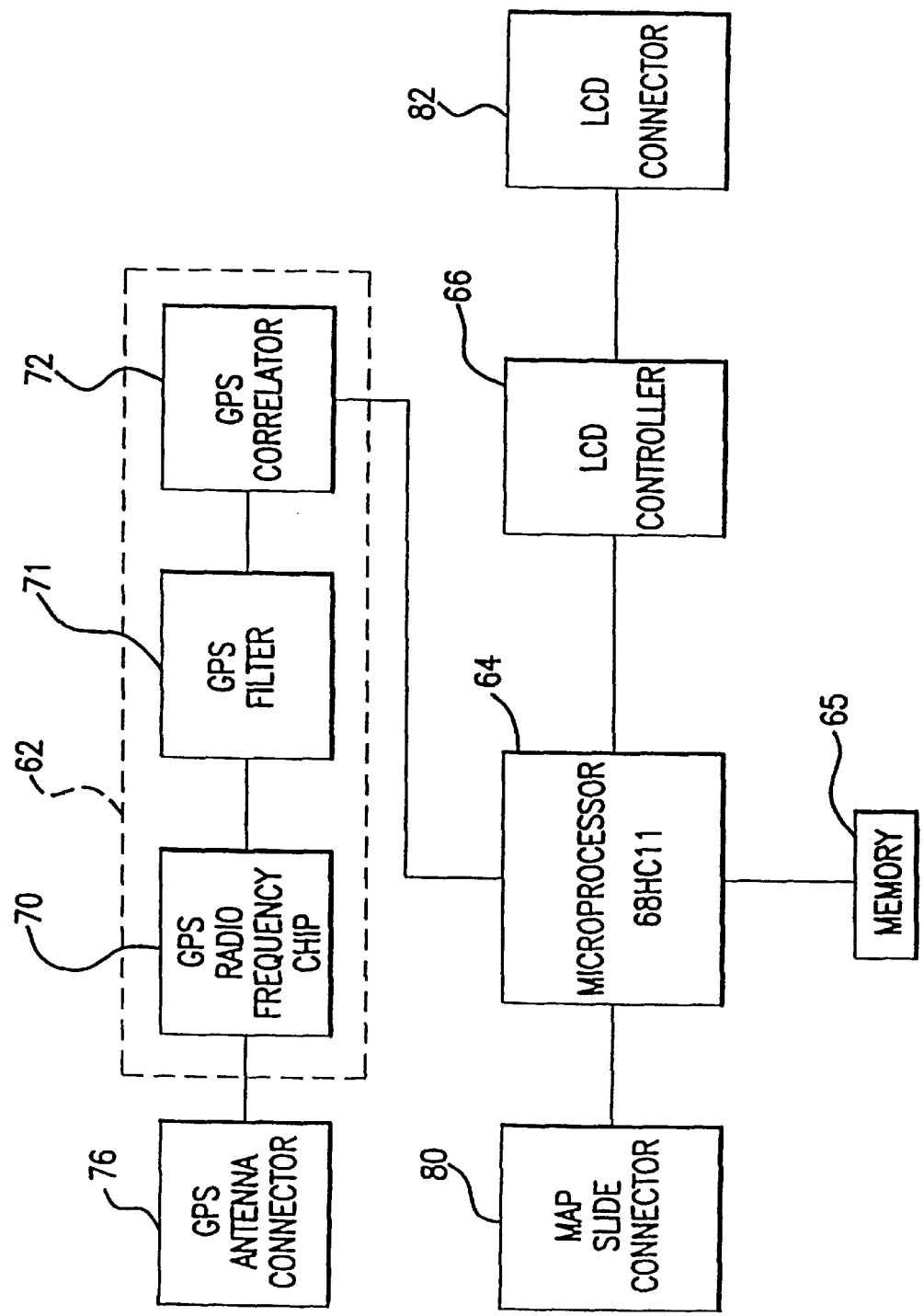
FIG. 2 presents the logic board of the control unit used in the device of FIG. 1.

FIG. 2 shows a block diagram of the various components making up the control unit 56. Within the control unit 56 is a logic board 60. Preferably, the logic board 60 is encased in aluminum case for EMI protection and also for improved ruggedness and structural reinforcement. In the preferred embodiment, the dimensions of the logic board 60 are 2.5"×3.5"×0.5". The logic board 60 includes a GPS chip set 62, a microprocessor 64 and an LCD controller 66, which typically comprises an LCD driver and associated interface logic, as is known to those skilled in the art of GPS system design.

The microprocessor 64, in the preferred embodiment is a 68HC11 microcontroller, available from Motorola. The microprocessor is provided with a local memory 65 which may comprise both read-write and read-only portions.

The GPS chip set 62 is a commercially available system provided by such vendors as Motorola, Rockwell or Philips. As is known to those skilled in the art, the GPS chip set 62 typically includes a GPS radio frequency (RF) chip 70, a GPS filter 71 and an GPS correlator 72. The output of the GPS correlator 72 is presented to the microprocessor 64 which processes information reflective of the position of the device.

The GPS RF receiver 70 is electrically connected to the disk-shaped GPS micropatch antenna 74 via a GPS antenna connector 76 on the logic board 60. A flexible cable (not shown) connects the GPS antenna 74 to the antenna connector 76. As shown in FIG. 1, the GPS antenna 74 is mounted flush over the compass at the top end 24 of the upper casing 32 and is hingedly attached thereto. Thus, the GPS antenna is movable from the open position of FIG. 1, when the device 20 is being used, to a closed position. When the GPS antenna 74 is in the open position, light passes through the compass 34, as discussed above. At nighttime, a user may direct a flashlight at the top end 24 to help illuminate the compass 34, the map image 52b and the display 54. Alternatively, a light emitting diode 57, placed on the slide holder, the display holder or some other component, and turned on each time that switch 90 is activated, may be used for illumination.

A map slide connector 80 is also provided on the logic board 60. The map slide connector 80 is connected by a ribbon cable, or equivalent, to the slide holder connector 50a on the slide holder 50 which carries the map slide 52 having map memory 52a. Alternatively, the map slide connector 80 can be a female (or a male) connector which mates with a complementary member on the slide holder connector 50a. The microprocessor 64 reads the map memory 52a via the map slide connector 80. This allows information in the map memory 52a to be accessed by the microprocessor 64 for subsequent processing and calculations, and also for ultimate presentation on the display 54.

An LCD connector 82 is also provided on the logic board 60. The LCD connector 82 is connected by a flexible ribbon cable, or equivalent, to the display connector 54a which is provided on the display holder 55, and provides a connection to the display 54.

The microprocessor 64 reads map information stored in the map memory 52a. This information typically will include the geographical extent of the map, such as the latitudes and longitudes delimiting its extent. This type of information, which is invariant for a given map image 52b is provided at the time the map slide 52 is created. Thus, when purchased by a user, the map slide 52 will already have the information representing the geographical extent of the map image 52b.

The microprocessor 64 uses the information representative of the geographical extent of the map, and integrates it with the GPS information which gives the user's current position. If the current position is within the geographical extent of the map image 52b, the microprocessor 64 outputs a first signal to the LCD controller. The first signal causes a blinking cursor, or other indicator, to appear on the display 54. As the display 54 is in the line of sight of the map image 52b, a viewer looking through the lens 26 sees the cursor superimposed on the map, with the cursor indicating the viewer's current position relative to the map image 52b. As the user moves within the geographical extent of the map, the cursor position is updated in a corresponding fashion.

If, on the other hand, the user's current position is not within the geographical extent of the map image 52b, the microprocessor 64 will output a second signal which causes the display 54 to indicate that the map image 52b does not contain the current location. For instance, the microprocessor 64 may cause the latitude and longitude, as sensed by the GPS system, to be written in alphanumeric characters on the display. In addition, or even in the alternative, an indicator light, such as a red light emitting diode (LED) positioned next to the LCD, but still within the line of sight, may be used to signify that the map image 52b does not include the current position. Regardless of how this is signified, the user is thereby notified that she should insert the correct map slide 52 which includes the current position.

In the preferred embodiment, a portion of map memory 52a may be written to by a user. Thus, in addition to the geographical extent of the map image 52b, the map memory 52a may also have limited space devoted to user-specified data, such as waypoints and routes. This information may be loaded by the user into the map memory 52a, by means of a personal computer or the like. For this, the present invention contemplates an adaptor connectable to a serial port of the personal computer, and into which a map slide 52 may be inserted. A software program resident on the personal computer reads the contents of the map memory 52a and displays it on a screen. The user is allowed to interactively add, change or delete information stored on the map memory 52a. This information may include waypoints for subsequent display, or even routes previously traveled. Once the user has completed making these changes, at least a portion of the map memory 52a is overwritten with the new information. Normally, however, the information representing the geographical extent of the map image 52b is not rewritten.

During use, when user-specified data is stored on the map memory 52a, and the current position is within the geographical extent of the map image 52b, the microprocessor 64 may also output additional signals to the LCD controller to write the user-specified data onto the display. In such case, then, the display 54 will show the cursor indicating the user's current position, in addition to the waypoints, routes and other user-specified data, superimposed on the relevant map.

Operation of the navigation device is now described. A user inserts the map slide corresponding to the intended area of travel and activates the GPS capability by pushing an ON/OFF switch 90 placed on lower casing 30. The antenna 74 is opened and the device is raised into the viewing position. The cursor appears on the display 54 in approximately 30 seconds, which is the typical time required to obtain a GPS position fix from a cold start. The cursor represents the user's position to within approximately 30–50 yards, given current civilian GPS receivers. The user then rotates the grid and direction wheels to establish the bearing to the user's planned destination, as described in the aforementioned patents. The user then flips the device over and the compass needle is aligned with the North marking on the case. Once this has been done, the second directional arrow indicates the bearing to be taken.

The present invention provides a number of benefits in the field of portable navigation devices. For instance, a device in accordance with the present invention accurately displays a user's position on a color map or other image such as an aerial photo, a satellite image or a vector map. The navigation device also allows a user, such as a hiker, to establish an accurate bearing or route to a destination without the need for additional navigation tools or devices. The device is long-lasting in the field, as it may be operated intermittently to conserve battery power. A device in accordance with the present invention is easy to use, and requires little, if any, training, in navigation, as one's current position and one's destination can be seen by viewing the display superimposed on the map. Finally, the electronic memory of the present invention permits a user to store a planned route to facilitate a journey.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A navigation device comprising:
   a case having a viewing end and a viewing axis;
   a microprocessor attached to said case;
   a transparent electronic display electrically connected to said microprocessor and mounted to said case, said display being oriented substantially perpendicular to said viewing axis;
   a global positioning system receiver (GPS) electrically connected to said microprocessor and arranged to provide a current position thereto;
   a slide holder configured and dimensioned to receive and retain an object in a position which is substantially parallel to said display; and
   at least one battery arranged to power at least said display and said microprocessor.

2. The navigation device of claim 1, further comprising a compass positioned along said viewing axis, said transparent electronic display being positioned between said viewing end and said compass, said compass indicating a magnetic bearing.

3. The navigation device of claim 2, wherein the magnetic bearing of said compass is visible from said viewing end, through said transparent electronic display, even when battery power is lost.

4. The navigation device of claim 1, wherein said current position is indicated in alphanumeric characters on said display.

5. The navigation device of claim 1, further comprising a map slide inserted into said slide holder, said map slide comprising:
   a slide frame configured and dimensioned to be inserted into said slide holder;
   a transparent map film mounted on said slide frame, said transparent map film comprising a map of a predetermined geographical area; and
   an electronic memory attached to said slide frame, said electronic memory including at least first information reflective of an extent of said predetermined geographical area,
   and wherein said microprocessor is connected to said electronic memory and is arranged to read said first information therefrom.

6. The navigation device of claim 5, wherein said current position is indicated on said display by alphanumeric characters, if said current position is not within said predetermined geographical area.

7. The navigation device of claim 5, wherein said current position is indicated on said display by a cursor, if said current position is within said predetermined geographical area.

8. The navigation device of claim 5, wherein said electronic memory also includes second information comprising waypoint and route information, and said microprocessor reads said second information from said electronic memory and writes said second information to said display.

9. The navigation device of claim 5, wherein said electronic memory is an erasable programmable read-only memory (EPROM).

10. A map slide comprising:
    a slide frame;
    a transparent map film mounted on said slide frame, said transparent map film comprising a map of a predetermined geographical area; and
    an electronic memory attached to said slide frame, said electronic memory including at least first information reflective of an extent of said predetermined geographical area.

11. The map slide of claim 10, wherein said electronic memory is an erasable programmable read-only memory (EPROM).

12. The map slide of claim 10, wherein said electronic memory is an electronically erasable programmable read-only memory (EEPROM).

13. A navigation device comprising:
    a case having a viewing end and a viewing axis;
    a microprocessor attached to said case;
    a transparent electronic display electrically connected to said microprocessor and mounted to said case, said display being oriented substantially perpendicular to said viewing axis;

a global positioning system receiver (GPS) electrically connected to said microprocessor and arranged to provide a current position thereto;

a slide holder configured and dimensioned to receive and retain an object in a position which is substantially parallel to said display;

a map slide inserted into said slide holder, said map slide comprising:
   a slide frame;
   a transparent map film mounted on said slide frame, said transparent map film comprising a map of a predetermined geographical area; and
   an electronic memory attached to said slide frame, said electronic memory including at least first information reflective of an extent of said predetermined geographical area; and
   at least one battery arranged to power at least said display and said microprocessor, wherein said microprocessor is connected to said electronic memory and is arranged to read said first information therefrom.

14. The navigation device of claim 13, further comprising a compass positioned along said viewing axis, said transparent electronic display being positioned between said viewing end and said compass, said compass indicating a magnetic bearing.

15. The navigation device of claim 14, wherein the magnetic bearing of said compass is visible from said viewing end, through said transparent electronic display, even when battery power is lost.

16. The navigation device of claim 13, wherein said current position is indicated on said display by alphanumeric characters, if said current position is not within said predetermined geographical area.

17. The navigation device of claim 13, wherein said current position is indicated on said display by a cursor, if said current position is within said predetermined geographical area.

18. The navigation device of claim 13, wherein said electronic memory also includes second information comprising waypoint and route information, and said microprocessor reads said second information from said electronic memory and writes said second information to said display.

19. The navigation device of claim 13, wherein said electronic memory is an erasable programmable read-only memory (EPROM).

20. The navigation device of claim 19, wherein said electronic memory is an electronically erasable programmable read-only memory (EEPROM).

* * * * *